United States Patent Office 2,723,947
Patented Nov. 15, 1955

2,723,947

REFORMING AND ISOMERIZATION WITH NOBLE METAL CATALYST

Alex G. Oblad, Springfield, and Thomas H. Milliken, Jr., Moylan, Pa., assignors to Houdry Process Corporation, Wilmington, Del., a corporation of Delaware No Drawing. Application May 16, 1951,
Serial No. 226,744

9 Claims. (Cl. 196—50)

The present invention relates to the production of aromatic hydrocarbons from non-hydroaromatic naphthenes and from petroleum fractions containing such naphthenes, and is particularly concerned with improved processes for effecting dehydroisomerization of five membered naphthene ring hydrocarbons to aromatic hydrocarbons such as more particularly benzene and toluene.

Five membered naphthene ring hydrocarbons are found in fairly high concentration in virgin light naphtha fractions as well as in naphtha fractions from thermal non-catalytic and hydrogenative-catalytic cracking. Such naphtha fractions also contain hydroaromatic naphthenes in greater or less amount depending upon the particular source of the naphtha. These hydroaromatic naphthenes, for instance cyclohexane and methylcyclohexane, can be readily and rapidly converted to the corresponding aromatic compounds such as benzene and toluene respectively, by ordinary dehydrogenation in the presence of the usual dehydrogenation catalyst (such as chrome-alumina) and with accompanying production of only insignificant quantities of carbonaceous deposit.

When five membered naphthene ring compounds such as methylcyclopentane, are subjected to dehydrogenation with these ordinary dehydrogenation catalysts under like conditions, cyclic monoolefins and diolefins are formed accompanied by the production of relatively large quantities of hydrocarbonaceous deposit, evidently resulting from side reactions including dehydrocondensation of cyclic olefin polymers. Because of the presence of a tertiary carbon structure, moreover, alkyl cyclopentanes are particularly susceptible to cracking with a tendency to rupture the naphthene ring.

Because of these inherent difficulties, it has been the previous practice in producing aromatic hydrocarbon compounds from five membered naphthene ring hydrocarbons, first to isomerize such compounds to cyclohexane and its homologues under selected isomerizing conditions and employing isomerization catalysts such as typically aluminum chloride; followed by dehydrogenation of the cyclohexane rings.

In accordance with the present invention isomerization and dehydrogenation of alkylated five membered naphthene ring compounds is accomplished in a single or in continuous reaction stages to produce superior yields of aromatic hydrocarbons. This is effected by carrying out the desired conversion of the naphthenes in the presence of a noble metal catalyst of the platinum family supported on an alumina base which has been subjected to mild acid treatment. These novel catalysts have been found to promote the desired isomerization with concomitant dehydrogenation at high conversion levels and without accompanying cracking of the naphthenes to any significant extent or the production of material quantities of coke. The described catalytic reaction can therefore be carried out for comparatively long periods of months or more without necessitating regeneration or replacement of the catalyst. The catalyst employed, however, is one which is capable of withstanding ordinary regeneration, such as heating in an oxygen atmosphere at temperatures of up to about 1000°–1100° F.; and, accordingly, the catalyst may be subjected to such regeneration at relatively infrequent intervals when found convenient or desirable.

The preparation of the catalyst is relatively simple. Alumina gel having a sufficiently porous and heat stable structure, such as the familiar activated alumina of commerce, is washed with mild or dilute acid at ordinary or room temperature. Elevated temperature may be employed particularly with weak or highly dilute acid, but no significant advantages have been noted as a result of temperature elevation. Any acid can be employed for the purpose which does not leave a detrimental residue in the catalyst. Thus, the more water soluble and stronger of the organic carboxylic acids can be employed, such as acetic acid, which are readily washed out with water. Extensive washing, however, is not necessary, since such acids are decomposed or volatilized at calcination temperatures without detrimental effect on the catalyst.

Among the inorganic acids, the phosphorus-containing acids such as phosphoric, and hydro-halogen acids, particularly hydrochloric, are preferred. In the use of the latter care should be taken to remove substantially all of the halide by washing or otherwise, since the presence of halogen in the catalyst may tend to promote cracking of the naphthenes, not only reducing thereby the desired yield of six membered carbocyclic compounds but tending to increase the formation of carbonaceous deposit. Fluoride containing residues in the catalyst are particularly undesirable and the use of HF is therefore best avoided, unless adequate precautions are taken for removing the difficultly removable fluoride ion. On the other hand, while phosphoric acid residues are also difficult to remove, the presence of such residue in the catalyst is not necessarily objectionable and may even be desirable from the standpoint of furnishing a component having isomerizing activity. The acids are usually employed in dilute form as in concentrations of 5–15% generally, or concentrations as low as 1 or 2% can be used in the case of mineral acids; concentrated carboxylic acids can be employed, if desired.

The amount and concentration of acid ordinarily is such that under the treating conditions not more than 10% and preferably not more than about 5% of the alumina is leached out thereby. The acid need not be employed as such; hydrolyzable acid-reacting salts in suitable concentration and amount, such as 10 to 15% solution of ammonium chloride or of an organic base chloride, being also effective, if no detrimental cation is introduced thereby.

Following acid treatment, the alumina is generally washed with water to remove soluble materials and dried, the extent of the water washing depending upon whether or not it is necessary to wash the product free of the anion of the particular acid or acid-reacting salt employed. The dried alumina is then calcined to remove combined water and volatiles, and is impregnated with the dehydrogenating metal component. Thus the alumina may be dipped in an aqueous solution of a decomposable compound of the noble metal of sufficient concentration to provide the desired quantity of metal in the finished catalyst and then heated or otherwise treated to effect conversion of the metal compound to the free metal, or to an oxide thereof reducible to a free metal. Suitable treating solutions include, for example, aqueous solutions of chloropalladic and chloroplatinic acid of suitable concentration to deposit from about 0.1 to 2.0% by weight of the noble metal in the catalyst, and preferably less than about 1.0% by weight thereof. Decomposition of the noble metal compound may be effected by treatment at elevated temperature in a reducing gas, such as hydrogen.

The process of the invention is applicable to the treatment of naphthene-containing gasoline and naphtha fractions for improving the octane quality thereof for use as motor and aviation fuels as well as for the production of aromatics for use as solvents and chemical intermediates. Hydroaromatic hydrocarbons as well as alkyl cyclopentanes present in the charge are converted almost completely, as up to 90% of the total thereof or more, to benzene and its homologues, accounting at least in part for the remarkable increase in octane values.

In carrying out the process of the invention, particularly for effecting dehydroisomerization of alkylcyclopentanes, temperatures in the range of from about 750–1050° F. may be employed and preferably in the range of 850–1000° F., pressures of about 200–1000 pounds per square inch, and with the addition of hydrogen in amounts of from about 3–10 mols per mol of hydrocarbon charged. Addition of extraneous hydrogen will be required only in starting up the operation, since hydrogen in the effluent may thereafter be recycled, the recycled gas being of a high degree of purity of over 95% and generally of about 98–99% hydrogen content.

EXAMPLE I

Commercial activated alumina pellets (Harshaw) were treated with 10% acetic acid solution for one hour, decanted, and the treatment repeated for another hour with fresh acid of the same concentration, an amount of acid being employed just sufficient to cover the pellets. The treated pellets were then washed a number of times with water, dried at 200° F. and calcined in air at 900° F. The calcined pellets were then dipped for ½ hour in a chloroplatinic acid solution of sufficient strength to give about 0.6% platinum on the finished catalyst. The impregnated catalyst was then dried at 200° F. and calcined at 1050° F. in air for 2 hours. On analysis the finished catalyst was found to contain 0.5% by weight of platinum.

The catalyst thus described was employed in treating a cut of East Texas naphtha of 60.5° API gravity and boiling over the range of 184–258° F., under the conditions tabulated below. The catalyst was treated in the reactor with hydrogen while that vessel was being brought up to operating pressure.

Run conditions:

| Temp., ° F. | Press., p. s. i. g. | $H_2$/oil Mol Ratio | Space Velocity, v./hr./v. |
|---|---|---|---|
| 950 | 300 | 4 | 6 |

The naphtha charge, which contained about 5% aromatics and 54% naphthenes by volume, was converted to 85% by volume of debutanized liquid product, containing 53% by volume aromatics. Under identical conditions a catalyst containing 0.5% platinum on commercial activated alumina which had not been acid-treated, yielded a product containing only 25% by volume aromatics.

EXAMPLE II

A catalyst consisting of 0.5–0.6% platinum on acetic acid leached alumina, prepared as described in Example I, was used under conditions set out below in treating a 188–366° F. fraction of an East Texas naphtha, which fraction contained 13% aromatics and had an octane rating of 51 ($F_1$ clear):

Run conditions:

| Temp., ° F. | Press., p. s. i. g. | $H_2$/oil Mol Ratio | Liquid Space Vel., v./hr./v. |
|---|---|---|---|
| 975 | 600 | 4 | 4 |

The yields and analysis of a sample of the product taken at equal periods of operation is given below on a loss-free basis:

| Yields | Vol. Percent | Wt. Percent |
|---|---|---|
| Gasoline ($C_5^+$) | 77.7 | 82.8 |
| Stabilized to 10# RVP | 86.0 | |
| Total $C_4$'s | 17.2 | 13.3 |
| Dry Gas | | 3.8 |

| Inspection of Gasoline ($C_5^+$) | | Octane Nos. | |
|---|---|---|---|
| Olefins, Vol., Percent | Aromatics, Vol., Percent | $F_1$ clear | +3 cc. TEL |
| 0.5 | 69.7 | 97.1 | iso+ 0.2 cc. TEL |
| Stabilized to 10# RVP gasoline | | 98 | |

The described process has wide flexibility, since with the same charge stock under milder operating conditions, and when made up to 10# RVP with outside butane, over 100% by volume gasoline of acceptable motor grade is obtained, as in the order of 106 volume percent of 75 clear F–1 octane number. Yields of about 85 to over 90% of $C_5^+$ gasoline by volume of charge, having respectively clear octane ratings in the range of over 90 to approximately 85, can be obtained under conditions of intermediate severity. As the severity of conditions is decreased there is a corresponding decrease in the amount of $C_4$'s and dry gas produced.

EXAMPLE III

Methyl cyclopentane was charged together with four times its molar quantity of hydrogen over catalyst similar to that of the preceding example under various operating conditions set out below and with the results shown in the following table (reported at equal periods of operation after an initial period of running to obtain stabilized results):

| | Pt on Acetic Acid leached $Al_2O_3$ | | | | | | Pt on non-leached $Al_2O_3$ |
|---|---|---|---|---|---|---|---|
| Temperature, ° F | 950 | | 950 | | 975 | | 950 |
| p. s. i. Pressure | 300 | | 250 | | 300 | | 250 |
| LSV, V./Hr./V | 6 | 3 | 3 | 1 | 6 | 3 | 3 |
| $C_5^+$, Vol. Percent | 97 | 96 | 87 | 87 | 94 | 94 | |
| Olefins, Percent in Prod | 2 | 2 | 1 | 1 | 4 | 2 | 4.2 |
| Aromatics, in Prod | 21 | 29 | 38 | 41 | 26 | 35 | 12.2 |
| Naphthene, Convers., Mole Per cent | 24.6 | 33.8 | 40.0 | 43.2 | 29.6 | 39.8 | |

EXAMPLE IV

In these runs, employing catalyst prepared as described in Example I, there was charged a light fraction of an East Texas naphtha, which fraction had a boiling range of 150–220° F. and contained 5–6% aromatics and 51% naphthenes by volume. The operation was continued over a period of about a month, samples of the product being taken periodically about every several days. The conversion of naphthenes remained substantially constant after the first day's operation. The yields and product inspection from the seventeenth day's run are given in the table below:

Run conditions:

| Temp., °F. | Liquid Space Vel., v./hr./v. | Recycle Gas to Oil Ratio, Mol/Mol | Pressure, p. s. i. g. |
|---|---|---|---|
| 925 | 4 | 5 | 300 |

Yields (no loss basis):

Conversion naphthenes to aromatics (vol. percent)_ 79
Liquid recovery ($C_5^+$) (vol. percent of charge)___ 93.0
Recycle gas purity (vol. percent $H_2$)_____ 99

Analysis of liquid product:

| Aromatics Vol. Percent | Olefins Vol. Percent |
|---|---|
| 41 | 1 |

It appears from the results obtained in treating the naphtha fractions according to the preceding examples that the presence of other components of the naphtha may have a beneficial effect in furthering the conversion of alkyl cyclopentanes therein to desired aromatics, and that in addition to the formation of aromatics from these and from hydro-aromatic naphthenes present in the charge, other desirable reactions take place leading to the production of conversion products of higher octane quality.

The high octane values of the reformed naphtha obtained, as illustrated for instance in Example II, are not accounted for by the conversion of naphthenes in the charge to aromatics; evidently some other reactions are concomitantly taking place accounting in part for the high octane values, which might include isomerization of normal paraffins to the branched chain compounds. This has been confirmed by subjecting n-heptane to contact with these catalysts under the range of conditions described with the production of comparatively high yields of iso heptanes as well as the formation of appreciable yields of aromatic compounds, as will be seen in Example VI.

EXAMPLE V

The catalyst employed in these runs was prepared as follows: Commercial alumina in pelleted form (Harshaw) was leached twice over 2 hour periods with 10% aqueous solutions of $NH_4Cl$ (1.029 specific gravity), and water washed until Cl free, then dried at 240° F. and calcined. The calcined pellets were impregnated with 0.5% platinum by the procedure described in Example I and calcined at 1050° F.

On a charge stock similar generally to that described in Example I and under the conditions given below, the following yields were obtained:

Run conditions

950° F., 300 p. s. i., L. S. V. 6, $H_2$/oil (moles) 4

Yields $C_5^+$ vol. percent of feed_____ 87.3
$C_4$ vol. percent of feed_____ 6.5
Dry gas wt. percent of feed_____ 3.8
Aromatics in $C_5^+$ fraction, vol. percent_____ 43.9

EXAMPLE VI

A charge consisting of n-heptane was subjected to conversion at a pressure of 600 p. s. i. in the presence of four mols of added hydrogen and in contact with a catalyst prepared as described in Example I, under the various operating conditions and with the results shown in the following table:

| Temperature, °F | 850 | 950 | | 975 | 1,000 |
|---|---|---|---|---|---|
| L. S. V., (V./Hr./V.) | 4 | 4 | 6 | [1] 6 | 4 | 4 |
| Yields: | | | | | | |
| Vol. Percent of feed— | | | | | | |
| total $C_7$ paraffins | 32.0 | 46.2 | 44.4 | 63.3 | 28.6 | 14.5 |
| iso $C_7$ | 18.7 | 27.0 | 24.2 | 30.0 | 18.0 | 8.2 |
| aromatics | 3 | 10 | 8 | 13 | 13 | 18 |
| $C_7$ iso: normal mol ratio | 1.4 | 1.4 | 1.2 | 0.9 | 1.7 | 1.3 |

[1] At 300 p. s. i.

From the foregoing it will be seen that the described catalysts can be advantageously utilized not only in upgrading of charge stocks of high naphthenic content and those containing an appreciable quantity of alkyl cyclopentanes, but also in the production of good yields of motor or aviation gasoline of enhanced octane values from lower grade naphtha fractions rich in normal paraffins.

Since the gas produced in the described naphtha conversion operations is of high hydrogen purity, it can be conveniently recycled; gas separation can be effectively carried out in a simple pressure separator at atmospheric temperature. The yield of hydrogen is better than 90% of the theoretical based on the conversion of naphthenes to aromatics, and indicates the high selectivity of the catalyst for the desired reaction in that it promotes very little hydro-cracking of naphthenes under the operating conditions employed.

Obviously many modifications and variations of the invention as hereinbefore set forth may be made without departing from the spirit and scope thereof and therefore only such limitations should be imposed as are indicated in the appended claims.

We claim:

1. The method of preparing hydrocarbon conversion catalyst which comprises: treating particles of activated alumina with aqueous acidic solution in order to modify the surface characteristics thereof while controlling the conditions of said acid treatment to leach less than 10% of the alumina from the particles; washing the mildly leached activated alumina particles with water to an extent substantially sufficient to remove the anion of the acidic solution; impregnating the purified, halide-free, surface-modified particles of activated alumina with a minor quantity of a compound of a noble metal of the platinum group; and decomposing said compound to form a noble metal on alumina catalyst.

2. The method according to claim 1 wherein said acidic solution comprises aqueous acetic acid of 5 to 15% concentration.

3. The method of preparing hydrocarbon conversion catalyst which comprises: treating activated alumina with aqueous acidic solution comprising ammonium chloride, washing with water to an extent sufficient to remove halide ions, and impregnating the alumina with a minor quantity of noble metal of the platinum group.

4. A catalyst having activity for promoting isomerization and dehydrogenation of hydrocarbons consisting of the product obtained by mild leaching of activated alumina with acid followed by sufficient washing to remove soluble materials and anions of the acid, followed by impregnation of the halide-free, purified, surface-modified activated alumina with chloroplatinic acid and subjecting the impregnated alumina to calcination, said catalyst containing 0.1 to 2% by weight platinum.

5. The method of upgrading gasoline and naphtha fractions containing naphthenes including alkyl cyclopentanes, which comprises subjecting such a fraction to contact with a catalyst comprising a minor quantity of a noble metal of the platinum group distributed in a carrier consisting of acid-treated halide-free, purified, surface modified activated alumina, said contact being effected in the presence of excess hydrogen and under conversion conditions including temperature in the range of about 750–1050° F. and superatmospheric pressure.

6. The method of converting alkyl cyclopentanes to aromatic hydrocarbons which comprises subjecting a hydrocarbon charge stock containing alkyl cyclopentane to catalytic dehydroisomerization in the presence of a catalyst of claim 1 in the presence of excess hydrogen and at a pressure of 200–1000 pounds per square inch.

7. The method according to claim 6 wherein said charge stock contains hydroaromatic compounds which are simultaneously dehydrogenated by said catalyst.

8. The method according to claim 6 wherein said dehydroisomerization is effected at about 850° and below 1000° F. under pressure of about 300 to 600 pounds per square inch.

9. The method of upgrading gasoline and naphtha fractions containing alkylcyclopentanes which comprises subjecting such a fraction to catalyst as defined in claim 4.

References Cited in the file of this patent

UNITED STATES PATENTS

| | | |
|---|---|---|
| 2,440,673 | Jones | May 4, 1948 |
| 2,474,440 | Smith et al. | June 28, 1949 |
| 2,479,110 | Haensel | Aug. 16, 1949 |
| 2,491,926 | Lorand et al. | Dec. 20, 1949 |
| 2,542,471 | Brandon | Feb. 20, 1951 |
| 2,542,970 | Jones | Feb. 27, 1951 |
| 2,550,531 | Ciapetta | Apr. 21, 1951 |
| 2,560,329 | Brandon | July 10, 1951 |